United States Patent [19]
Minks

[11] Patent Number: 5,757,165
[45] Date of Patent: May 26, 1998

[54] SNOWMOBILE HANDLEBAR HEATER CONTROL

[76] Inventor: Floyd M. Minks, 2700 Partin Settlement Rd., Kissimmee, Fla. 32743

[21] Appl. No.: 584,044

[22] Filed: Jan. 11, 1996

[51] Int. Cl.$^6$ .................................................. H05B 1/00
[52] U.S. Cl. ........................... 322/33; 322/36; 322/100; 219/240
[58] Field of Search ........................ 322/91, 100, 33; 219/240

[56] References Cited

U.S. PATENT DOCUMENTS

| | | | |
|---|---|---|---|
| 3,755,685 | 8/1973 | Minks | 307/9 |
| 4,490,779 | 12/1984 | Minks | 363/48 |
| 4,791,349 | 12/1988 | Minks | 323/266 |
| 5,117,178 | 5/1992 | Roth | 323/320 |
| 5,202,811 | 4/1993 | Minks | 361/56 |
| 5,349,161 | 9/1994 | Bockholt | 219/385 |
| 5,525,896 | 6/1996 | Minks | 323/282 |

Primary Examiner—Thomas M. Dougherty
Assistant Examiner—Nicholas Ponomarenko
Attorney, Agent, or Firm—Allen, Dyer, Doppelt, Milbrath & Gilchrist, P.A.

[57] ABSTRACT

A solid state control circuit controls handlebar heaters on a snowmobile or similar responding loads. Circuit is supplied by AC voltage with variations in frequency and waveform of the AC input. A portion of this input is rectified and compared with a rectified portion of the output voltage. The difference between these two signals is used to supply two amplifying devices. A control signal to a switching device selectively connects one polarity of the AC to the load. The circuit is adapted to be disabled by the application of an external voltage typically from a brake light switch and bulb. The opposite polarity of the waveform is controlled from the AC to the load by sensing the DC component across the load and using a second switching device to drive this DC value to a negligible value. Components are incorporated that are sensitive to temperature and also waveform to produce higher output heating at high vehicle speed and lower operating ambient temperatures or airflows.

10 Claims, 2 Drawing Sheets

SNOWMOBILE HANDLEBAR HEATER CONTROL

FIELD OF THE INVENTION

The present invention relates to solid state control of electrical loads, and in particular to the control of a snowmobile handlebar heater when the power supply has wide variations in frequency and waveform and may have insufficient power for the load during power demands from other snowmobile electrical components.

BACKGROUND OF THE INVENTION

Snowmobile electrical systems typically derive power from a permanent magnet alternator driven by the crankshaft of the engine. These alternators are typically regulated to approximately 14 volts TRMS by an AC shunt regulator such as is shown in applicant's co-pending application, U.S. Ser. No. 08/499,365 filed Jul. 7, 1995 for *Power Generation and Regulation Apparatus*. The resulting voltage has a constant true RMS value. However, the waveform is non sinusoidal and may have portions of the waveform with very rapid rates of change in voltage with time. The voltage varies in frequency with varying engine speed and the wave shape and form factor vary with the application or removal of various loads. The size of these alternators is restricted by the weight, cost and space available on the vehicle and therefore in many cases they are not capable of running all loads simultaneously at specified voltage particularly at low engine speeds. In addition to lighting and battery charging loads, a known load on vehicles of this type is from electrically heated handlebars. These traditionally have been either turned off, set to low power, or set to high power through an operator controlled switch. AC temperature or voltage control methods typically used with 60 cycle power have proven to be difficult or at best impractical to apply to these circuits because of the previously mentioned variations in frequency and waveform.

Halfwave control techniques, as will be understood by one skilled in the art, are wasteful of electrical energy available from an alternator of this type which has essentially a constant current output. Fullwave control with devices such as a triac is difficult or impossible with the frequency and rate of change of voltage with time sometimes present in these systems. Even though the handlebar heaters will not respond adversely to waveforms which are turned on and off at a relatively low rate, control technology producing this type of switching will cause a noticeable and objectionable flicker in the headlights of the vehicle. Brake lights on vehicles of this type draw a significant amount of power. Therefore, if the handlebar heaters, brake lights and other loads are on simultaneously, significant and potentially dangerous dimming of the headlights can occur at a critical time.

The amount of heat required increases as the temperature of the vehicle operated decreases and also increases with the speed of the vehicle through the air. These vehicles operate over a very wide temperature range. Therefore, it is possible for the amount of heat that is required at low temperature and high speed to cause excessive temperature or destruction of the heating elements or handlebar grips at low speed and moderately warm temperatures.

SUMMARY OF THE INVENTION

It is an object of the present invention to produce an electronic control for handlebar heaters or similar items including variable rate shock absorbers having electronic control. The control of this invention is a fullwave AC control with a variable voltage output. This invention uses a close loop feedback system. A portion of the voltage across the load representative of the power provided to the load is measured and compared with a second voltage representative of the power source. The second voltage is set by the operator. Appropriate phase shifts or delays are incorporated in this comparison portion of the circuit to give smooth control and prevent flickering of the headlights or other loads on the vehicle. The main control elements are two parallel solid state switches typically called silicon control rectifiers, although other switching devices could be used. Since these devices are parallel back to back, turn off problems are eliminated. A disabled signal is introduced into these control elements from the brake light circuit so that when the brakes are applied and therefore the brake light energized, the handlebar heaters are de-energized to reduce the load on the alternator and therefore the potential dimming of the headlight. This allows a single pole single throw (SPST) switch to be used for the brake lights and handle bar heater control instead of a single pole double throw (SPDT) switch typically used in control methods.

Circuitry is included to limit the maximum output voltage and therefore power to the heater as a known and desired function of the temperature of the control module. It should be noted that since there is some electrical energy dissipated in this circuit, it can be mounted so that it is primarily cooled by the movement of air. The air movement is generated as the vehicle moves thus creating a rise in available power as vehicle speed increases. Sensitivity to both ambient temperature and vehicle speed is thus provided. This circuit can be controlled by either a conventional potentiometer, variable resistor, or by an integrated circuit which produces a variable output voltage in response to momentary closures of switches for increasing or decreasing the output.

It is a further object of the invention to produce a circuit which will operate over a temperature range of at least −60° to +100° C. with readily available commercial components and capable of withstanding repetitive positive and negative portions of the AC input waveform in excess of 100 volts, not untypical in some of today's snowmobile alternator and regulator systems even though the RMS voltage is limited to 14.

BRIEF DESCRIPTION OF THE DRAWINGS

A preferred embodiment of the invention, as well as alternate embodiments, are described by way of example with reference to the accompanying drawings, in which.

DETAILED DESCRIPTION OF THE DRAWINGS

Figure 1:
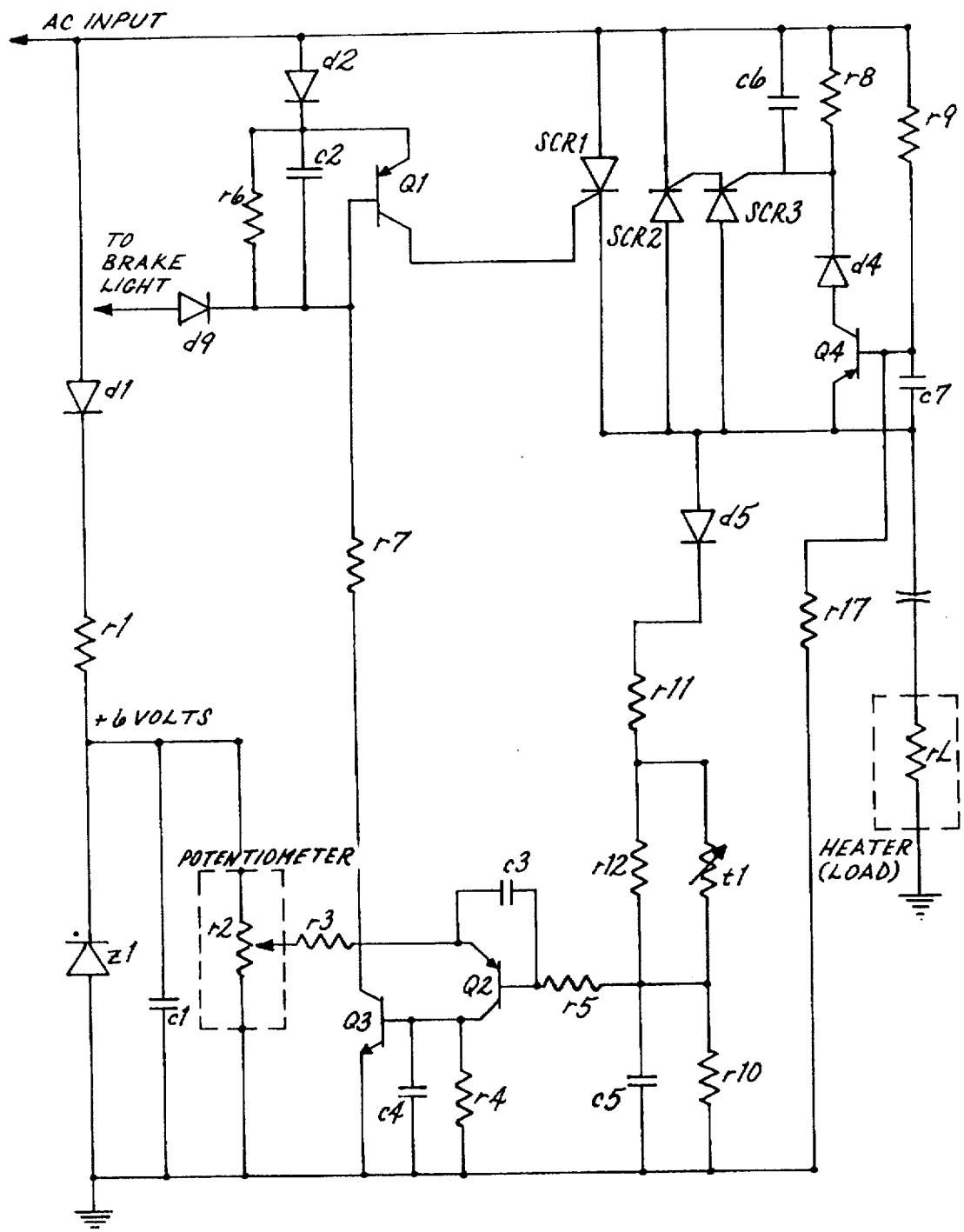
FIG. 1 is a circuit diagram of a preferred embodiment of the present invention with a mechanical potentiometer for the control element for operation by the operator.

The handlebar heater control system as illustrated with reference to FIG. 1, is intended to be connected to a source of power, such as permanent magnet alternator controlled by an AC regulator as shown in applicant's earlier cited co-pending application Ser. No. 08/449,365. An AC voltage is applied between ground and the terminal marked AC input. A small amount of this power is rectified by diode d1 with the current being limited by resistor r1 to produce a controlled DC voltage across filter capacitor C1 with the voltage regulated by zener diode Z1. A voltage of approximately +6 volts in a typical application is thus available across C1 having a current capability of a few milliamperes. An operator selectable portion of this voltage is made available for circuit control by connecting a potentiometer r2 across capacitor C1. The maximum current from the wiper of the potentiometer is limited by current limiting resistor r3.

SCR1 is connected with its anode to the AC line and its cathode to the handlebar heater or load shown as $r_L$. Thus, if a gate signal is supplied to SCR1, the positive portion of the AC waveform will be applied to the load $r_L$. This positive portion of the waveform across $r_L$ is also applied across a network consisting of d5, r11, r12, thermistor t1, capacitor C5 and resistor r10. Thus a DC voltage is created across C5 that is a known function of the positive waveform applied to the load $r_L$. By appropriate selection of the time constants between C5, r10, r11 and r12 and the thermistor, the voltage across C5 may be made responsive to primarily the peak or primarily the average of the positive DC component across the load. Also, the magnitude and to an extent the phase of the AC component across C5 may be selected to give smooth control and eliminate headlight flicker which might otherwise result.

Thermistor characteristics and the calculations of values for a network such as r11, r12 and t1 to give desired changes of resistance and therefore output voltage change with temperature are known in the industry and will not further be discussed here. It should be pointed out however that one skilled in the art could also apply a known positive or negative temperature coefficient resistor in locations r10 or r11 to obtain desired output voltage characteristics versus ambient temperature and the flow of cooling air over this module. The current withdrawn from capacitor C5 for the control circuit is limited by resistor r5, thus the base emitter junction of an amplifying device or transistor Q2 is connected between r3 and r5. A capacitor C3 is placed across the input or base emitter junction of this transistor to eliminate high frequency components and to give a desired phase shift for smooth control.

It would be apparent to one knowledgeable in the art that the first stage of a closed loop control system has been created by using Q2 to compare a portion of the fixed voltage across C1 with the voltage across C5, which is a function of the output voltage that is applied to the load $r_L$. Thus, if the voltage across the load $r_L$ tends to rise above the desired level, voltage across C5 will exceed the voltage from the output of potentiometer r2 and transistor Q2 will be turned off. However, if the voltage across the load $r_L$ drops below the desired level, the voltage on C5 will be below the voltage from r2 and transistor Q2 will be turned on. Voltage as used here refers to the positive potential above ground. The base emitter saturation of Q2, which would be typically about 0.6V with a negative temperature coefficient of approximately −2 MV per deg. C., must be considered. Other amplifying devices, such as field effect transistors, could be substituted for any of the transistors of FIG. 1. However, the temperature coefficient of the bipolar transistor shown as Q2 desirably decreases output to $r_L$ with temperature increase. The heater element $r_L$ can be made from a material such as nickel, that has a positive temperature coefficient, as an additional or alternate method of compensating for ambient temperature and vehicle speed, the resistance change of all or part of $r_L$ if thus constructed could be compared with a fixed register or linear part of $r_L$ and be used to control SCR1 and SCR2.

The collector terminal output of transistor Q2 is connected to the base or input terminal of a second amplifying device shown as transistor Q3. The emitter or common input/output terminal of Q3 is connected to ground. Capacitor C4 and resistor r4 are connected from the base to the emitter of Q3. C4 and r4 allow stable operation of Q3 over a wide temperature range and in the presence of high frequency components on the collector of Q3. Also C4 and r4 can be used to give further desirable phase shift for a smooth and stable operation of the circuit. Note that as is highly desirable, the lowest level amplifier stage Q2 is operating from direct current throughout the waveform. The output or collector of transistor Q3 is connected through current limiting resistor r7 to the base or input of a third amplifying device shown as transistor Q1. The base emitter junction of this amplifying device is shunted by resistor r6 and capacitor C2 in parallel, again to give a desired phase shift and to allow stable operation in the presence of high frequency, high amplitude AC components. The emitter of transistor Q1 is connected to the AC line through diode d2 thus protecting the circuit from reverse voltage or current through Q1 and SCR1 and/or Q3 flow during the portion of the waveform when the AC line is negative with respect to ground. The output of transistor Q1 is connected directly to the gate of SCR1.

Some typical values will now be given not as a limitation but to an aid in understanding the operation of the circuit. If the gate current to fire of SCR1 is typically 10 milliamperes at room temperature, an increase at the lowest operating temperatures may be expected to be up to 40 milliamperes. If minimum gain for transistor Q1 is 100, then the required base current for transistor Q1 is 0.4 milliamperes. With additional current through r6, a current of half a milliampere through r7 and therefore Q3 would be sufficient to turn on SCR1 even under worse case conditions. If a DC current gain of 100 minimum is assumed for Q3, then its required base current is 5 microamps. If another 5 microamps is assumed to be diverted through r4 than the maximum collected current needed for Q2 is 10 microamps. Thus, the maximum required emitter current of transistor Q2 is approximately 10 microamps requiring at a gain of 100 a base current of a tenth of the microamp. Thus, r5 may be in the order of hundreds of thousands of ohms allowing both C3 and C5 to be small value such as 0.1 MF, which is readily available in ceramic capacitors that will operate over the temperature range desired for this circuit. One skilled in the art will also realize that resistor r3 can be in the order of tens of thousands of ohms, thus preventing the discharge or loading of the voltage across capacitor C1 even when potentiometer r2 is set for its maximum output voltage.

Typically in snowmobile wiring, a brake light switch is connected between the AC line and one side of the brake light bulb with the other side of the brake light bulb to ground. Thus, effectively the voltage from the brake light bulb to ground is zero when the brake is not on and at the AC line potential when the brake is on. Diode d9 has its cathode connected to the base of transistor Q1 and its anode goes to a connector to be connected to the junction between the brake light bulb and brake light switch. Therefore, during the positive portion of the AC cycle and when the brake lights are on, full AC voltage is supplied to the base of transistor Q1 except for the drop in diode d9. Thus, Q1 is turned off even if transistor Q3 is on with the current through resistor r7 being supplied through diode d9 which is a lower voltage drop than the sum of the forward drop of diode d2 and the base emitter saturation voltage of Q1. Thus transistor Q1 is effectively turned off, turning off SCR1 whenever the brake is applied, regardless of whether transistor Q2 and thus Q3 are on or off. Thus SCR1 is used in a dual purpose to control the amount of voltage and therefor heat to the load $r_L$ under normal operating conditions and to turn off the power to load $r_L$ when the brake is applied. This eliminates the necessity of a known method consisting of a SPDT brake light switch or a second solid state switch wired in series with the handlebar heater circuit.

The control of positive portion of the waveform has been described, the control of the negative portion will now be described. A general description of the negative control is that the average direct current voltage across the load $r_L$ is sensed and used in a circuit which drives the DC average voltage to zero or an acceptably low value. A similar circuit is shown and described in applicant's co-pending application previously mentioned. If the AC input line has low or negligible DC average component, the DC component created across $r_L$ by the turning on of SCR1 will also appear if averaged over an entire cycle or cycles as a reverse DC average voltage across SCR1. This DC component will appear across the series combination of C7 and r9. If the base current of amplifying device shown as transistor Q4 is negligible the entire DC component will appear across capacitor C7. One skilled in the art will realize that it is in the direction to turn on transistor Q4 and also that the phase of the ripple that will be present on the voltage across C7 is such as to increasingly turn on transistor Q4 in the later portions of the half cycle that it is biased in the direction it can conduct. Reverse current through Q4 is prevented by diode d4. The output or collector current of transistor Q4 is connected to the gate of a sensitive gate SCR or other amplifying device shown as SCR3. Undesired high frequency components and leakage currents are controlled by capacitor C6 and resistor r8 and these components can further create desired phase shift to give smooth control. Thus the DC component which appears across $r_L$ as a result of the conduction of SCR1 also appears as an average on capacitor C7 which turns on transistor Q4 which turns on SCR3. The cathode of SCR3 is connected to the gate of a higher current SCR2 which is directly from the AC line to the load. Thus SCR2 and its associated drive components just described act as a slave circuit sensing the DC voltage across the load and driving it to a low value. Additional accuracy or gain, if needed, can be obtained by connecting an optional resistor, r17, from the base of transistor Q4 to ground. When SCR1 is on, current through r17 will charge C7 to allow Q4 to be turned on earlier in the negative portion of the AC waveform. Thus SCR1 and SCR2 together supply fullwave AC current to the load $r_L$ up to the maximum voltage that is available of either polarity from the AC line with only the small power dissipation and voltage drop of SCR1 and SCR2. Almost all (typically over 98%) of the losses in this circuit are the ON voltage drop in SCR1 and SCR2.

It will be realized by one skilled in the art that, as just described, the positive and negative portion of the waveform tracks with each other since SCR2 is a slave to SCR1. Therefore, the control voltage described as being across C5 could be rectified from either polarity of the waveform of the voltage across $r_L$. This in its simplest form would give a negative voltage across C5 compared to that across C1 of the opposite polarity and would be particularly well suited to substitute an junction field effects transistor for Q2, r4 and C4. It is known that the form factor or ratio of peak voltage the AC waveform compared to the RMS will increase in a typical snowmobile or electrical system with RPM. Thus if the time constant of C5 with the resistors in that control branch becomes long compared to the period in high frequency, that control branch will respond to the average as opposed to the RMS, and the effective heat to the load $r_L$ will increase within an RPM, which can be highly desirably in some applications.

Figure 2:
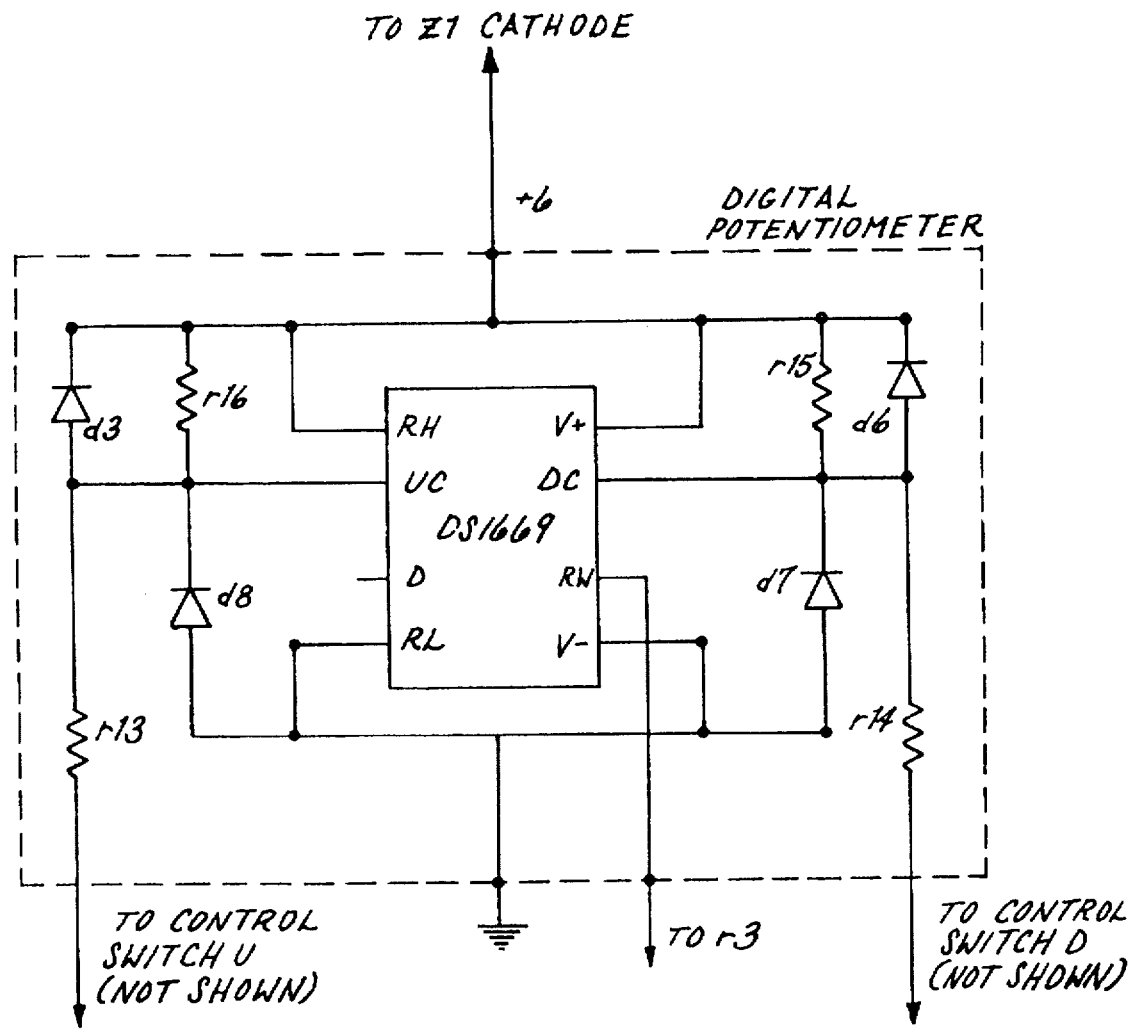
FIG. 2 is an alternate circuit for a typical commercially available solid state integrated circuit substituted for the mechanical potentiometer, and associated components added which are required for reliable operation in the snowmobile environment.

FIG. 2 shows an adaptation of a known digital potentiometer useful with the circuit of FIG. 1. A circuit commercially marketed as Type DS1669 requires a DC input voltage labeled as +6 which would be connected to the cathode of zener diode Z1 in FIG. 1. Six volts is typical of the DS1669, but not a limitation of this invention. The potentiometer element RH and RL is shown connected between the +6 or the V+ point and ground or −V with the output or RW connected to r3 of FIG. 1. With the wide temperature range, and less than ideal switches likely to be used on a snowmobile, pullup resistors r15 and r16 are added from the control UC and DC terminals to the +6. Also protective or current limiting resistors r13 and r14 are connected from these control terminals to be connected to external switches, not shown, which would connect these points to ground to change the setting of the potentiometer. Diodes d3, d6, d7 and d8 clamp the control input UC and DC to the +6 and ground so that any input voltage to the ends of r13 or r14 that exceed the positive direction +6 or in the negative direction ground will be clamped preventing damage to the solid state potentiometer. This is true even if these control leads are inadvertently connected to the AC line. Capacitors, not shown, may be connected in parallel with d8 and d7 if additional filtering or noise protection is required. The total current draw of the circuit in FIG. 2 is approximately 2 milliamperes. Thus capacitor C1 can readily be a small dry tantalum. If a mechanical potentiometer is used as is shown in FIG. 1, capacitor C1 could realistically be a ceramic capacitor and zener diode Z1 might be eliminated.

Table 1 includes circuit element parts and their description for those electronic parts used in the preferred embodiment of the present invention as illustrated with reference to FIG. 1 and the alternate potentiometer embodiment of FIG. 2.

While specific embodiments of the invention have been described in detail hereinabove, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

TABLE 1

| Electronic Circuit Element | Component Part Identification | Electronic Circuit Elements | Component Part Identification |
|---|---|---|---|
| d1 | IN4004 | C1 | 33 MF 15V |
| d2 | IN4004 | C2 | .001 MF X7R |
| d3 | IN914 | C3 | .1 MF X7R |
| d4 | IN4004 | C4 | .1 MF X7R |
| d5 | ISS139 | C5 | .1 MF X7R |
| d6 | IN914 | C6 | .001 MF X7R |
| d7 | IN914 | | |
| d8 | IN914 | r1 | 430 OHMS |
| d9 | IN4004 | r2 | 50K |
| | | r3 | 16.5K |
| Z1 | IN5235B | r4 | 100K |

TABLE 1-continued

| Electronic Circuit Element | Component Part Identification | Electronic Circuit Elements | Component Part Identification |
|---|---|---|---|
|  |  | r5 | 511K |
| t1 | IC3002-5 | r6 | 3.01K |
|  |  | r7 | 3.01K |
| Q1 | MPSA92 | r8 | 16.5K |
| Q2 | MPSA56 | r9 | 511K |
| Q3 | 2N5551 | r10 | 511K |
| Q4 | MPSA56 | r11 | 120K |
|  |  | r12 | 511K |
| SCR1 | S2800B | r13 | 1K |
| SCR2 | S2800B | r14 | 1K |
| SCR3 | MCR 100-4 | r15 | 12.4K |
|  |  | r16 | 12.4K |
|  |  | r17 | 1 meg |

What is claimed is:

1. A snowmobile handlebar heater controller comprising:
   a source of AC Power;
   a heating element;
   a solid state switching element connected in series between the power source and the heating element;
   a first control signal having a voltage representative of the power source;
   a second control signal having a voltage representative of the voltage across the heating element;
   means for adjusting the voltages and thus the control signals, the voltage adjusting means responsive to an operator control; and
   means for comparing the first and second control signals and providing an input signal to the switching element for producing a closed loop control.

2. The controller as recited in claim 1, further comprising a second solid state switching element in parallel with the solid state switching element, the second switching element conductive in an opposing direction, the second switching element sensitive to an average DC component across the heating element for reducing the value of the component to a negligible value, thus producing a full wave control.

3. A snowmobile handlebar heater control for a snowmobile having a brake light system the handlebar heater control comprising:
   a solid state switching device;
   a heating element connected in series with the switching device;
   a source of AC power electrically connected for operating the heating element and the switching device; and
   an input terminal operable with the switching device, the input terminal made sensitive by a control network to both an operator controlled input for increasing or decreasing the power to the heating element and a voltage from a brake light system to turn off the solid state switching device thus reducing power to the heating element during a portion of time when a brake light signal is applied from the brake light system.

4. A snowmobile handlebar heater controller comprising:
   a source of AC power;
   a heating element for heating a snowmobile handlebar;
   a solid state switching device connected in series between the source of the AC power and the heating element, the switching device responsive to an input signal for delivering the source of power to the heating element;
   first voltage measuring means for measuring a portion of the voltage of the source of power and for providing a first control signal representative of the voltage of the source of power;
   second voltage measuring means for measuring a portion of the voltage across the heating element for providing a second control signal representative of the voltage across the heating element; and
   electrical signal comprising means for comparing the first control signal and the second control signal, the signal comparing means providing an input signal to the switching device.

5. The controller as recited in claim 4, further comprising a first signal varying means operable with the first voltage measuring means for varying the first control signal.

6. The controller as recited in claim 5, wherein the signal varying means comprises a potentiometer.

7. The controller as recited in claim 4, further comprising a second signal varying means operable with the second voltage measuring means for varying the second control signal.

8. The controller as recited in claim 7, wherein the signal varying means comprises a thermistor operable within an electrical circuit connected across the heater element.

9. A method for controlling a heating element for handlebars of a snowmobile, the snowmobile having a source of AC power for use with the heating element, the method comprising the steps of:
   measuring a portion of the voltage provided by the source of AC power supplied to the heating element, the power source voltage portion representative of the source supplied to the heating element;
   measuring a portion of the voltage across the heating element, the heating element voltage portion voltage representative of the load across the heating element;
   comparing the power source and heating element voltage portions and providing a switching signal when the difference between them is within a preselected voltage value; and
   adjusting the source of power provided to the heating element in response to the switching signal.

10. The method as recited in claim 9, further comprising the step of varying the measured voltage portions prior to the comparing step.

* * * * *

UNITED STATES PATENT AND TRADEMARK OFFICE
CERTIFICATE OF CORRECTION

PATENT NO. : 5,757,165
DATED : May 26, 1998
INVENTOR(S) : Floud M. Minks

Page 1 of 1

It is certified that error appears in the above-identified patent and that said Letters Patent is hereby corrected as shown below:

Signed and Sealed this

Twenty-ninth Day of January, 2002

Attest:

JAMES E. ROGAN
Attesting Officer
Director of the United States Patent and Trademark Office